United States Patent [19]
Schmitz-Huebsch et al.

[11] Patent Number: 5,345,915
[45] Date of Patent: Sep. 13, 1994

[54] CONTROL SYSTEM FOR THE ELECTRIC FUEL PUMP OF AN INTERNAL COMBUSTION ENGINE

[75] Inventors: Axel Schmitz-Huebsch, Remseck; Ulrich Koelle, Schwieberdingen; Dietmar Flaetgen, Vaihingen/Enz, all of Fed. Rep. of Germany

[73] Assignee: Robert Bosch GmbH, Stuttgart, Fed. Rep. of Germany

[21] Appl. No.: 39,356

[22] PCT Filed: Apr. 9, 1992

[86] PCT No.: PCT/DE92/00740

§ 371 Date: Apr. 22, 1993

§ 102(e) Date: Apr. 22, 1993

[87] PCT Pub. No.: WO93/07376

PCT Pub. Date: Apr. 15, 1993

[30] Foreign Application Priority Data

Oct. 10, 1991 [DE] Fed. Rep. of Germany ....... 4133558

[51] Int. Cl.$^5$ .................. F02M 37/04; F02B 77/00
[52] U.S. Cl. ..................... 123/497; 123/479; 123/198 D
[58] Field of Search ........... 123/497, 499, 198 D, 123/198 DB, 359

[56] References Cited

U.S. PATENT DOCUMENTS

| | | | |
|---|---|---|---|
| 2,648,746 | 11/1953 | Dickey . | |
| 3,661,130 | 5/1972 | Eheim | 123/359 |
| 3,834,361 | 9/1974 | Keely | 123/479 |
| 4,402,290 | 9/1980 | Hofer | 123/198 DB |
| 4,425,889 | 1/1948 | Hachitani et al. | 123/479 |
| 4,630,577 | 12/1986 | Cornacchia | 123/198 DB |
| 4,785,771 | 11/1988 | Ibuki | 123/479 |
| 4,823,751 | 4/1989 | Pfalzgraf | 123/359 |
| 4,862,829 | 9/1989 | Wilson | 123/198 D |
| 4,941,445 | 7/1990 | Deutsch | 123/479 |
| 4,996,964 | 3/1991 | Ohuchi | 123/479 |

FOREIGN PATENT DOCUMENTS

| | | |
|---|---|---|
| 827137 | 1/1952 | Fed. Rep. of Germany . |
| 1526504 | 3/1970 | Fed. Rep. of Germany . |
| 2249235 | 4/1974 | Fed. Rep. of Germany . |
| 2514404 | 10/1976 | Fed. Rep. of Germany . |
| 2065928 | 7/1977 | Fed. Rep. of Germany . |
| 3223318 | 1/1983 | Fed. Rep. of Germany . |
| 3145732 | 5/1983 | Fed. Rep. of Germany . |
| 3610064 | 10/1986 | Fed. Rep. of Germany . |
| 3840912 | 6/1989 | Fed. Rep. of Germany . |
| 3802101 | 8/1989 | Fed. Rep. of Germany . |
| 2051227 | 1/1981 | United Kingdom . |

OTHER PUBLICATIONS

Power, Bd 132, Nr. 9, Sep. 1, 1988, New York, US, pp. 39-42 Lockner "Enhancing Prime-Mover Controls with Fault-Tolerant Systems".

*Primary Examiner*—Carl S. Miller
*Attorney, Agent, or Firm*—Michael J. Striker

[57] ABSTRACT

A control system is described for the electric fuel pump of an internal combustion engine, with a sensor for the speed of a shaft of the engine and with a logic circuit for providing a shut off signal for the pump, depending on the speed detected, where the signal of a further sensor (14) for the speed is supplied to the a logic circuit (16, 17), and where shut off then takes place only when both speed signals deviate from a specified range. In this way, it is ensured that the vehicle remains drivable if one of the two sensors (13) or (14) fails.

4 Claims, 1 Drawing Sheet

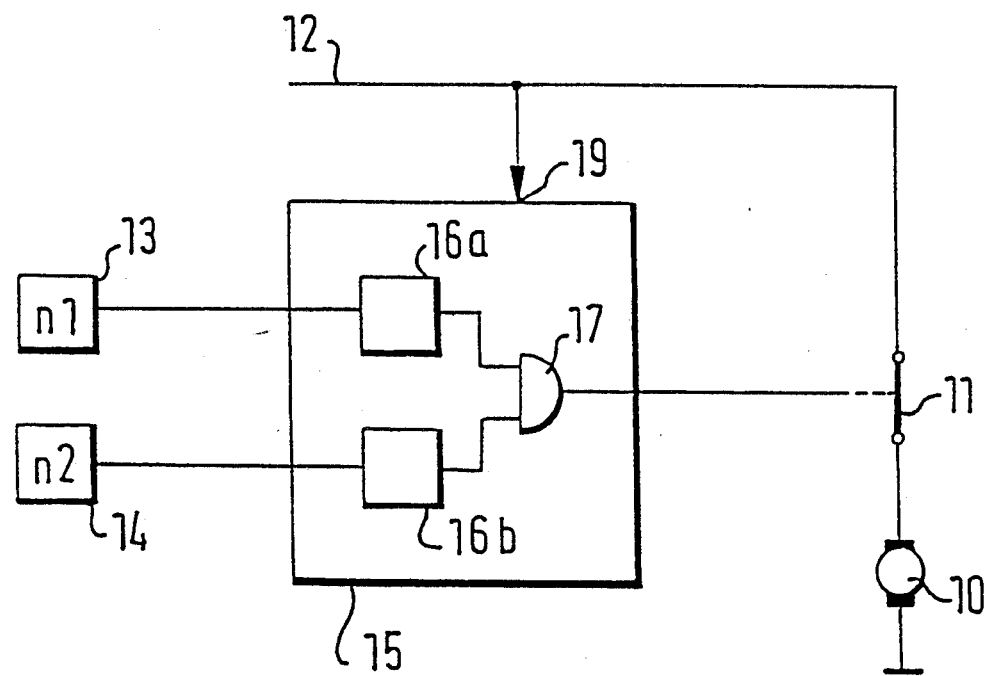

CONTROL SYSTEM FOR THE ELECTRIC FUEL PUMP OF AN INTERNAL COMBUSTION ENGINE

BACKGROUND OF THE INVENTION

The invention is based on a control system for the electric fuel pump of an internal combustion engine From DE-PS 1 526 504, a circuit arrangement for driving a fuel pump in an internal combustion engine is known, in which below a minimum engine speed, the supply of electricity to the fuel pump is cut off. The circuit arrangement described there is based on the concept that, when the ignition is switched on, the engine speed drops below minimum values only when the engine is braked by external intervention, especially in the case of an accident. In this case, for reasons of safety, the supply of fuel from the tank in the direction towards the engine should be interrupted. Furthermore, in the German Published Patent Applications 20 65 928 and 22 49 235, devices are described which, for the same aforementioned reasons, interrupt the supply of fuel to the engine when it is stopped. There, this standstill of the engine is detected via an appropriate detection of the air flow in the induction manifold, in that in the idle position of the air flow meter flaps in the intake pipe, a switch is activated accordingly, and that depending on this switch activation, the electricity supply to the electrically driven fuel pump is then also interrupted. Naturally, for the case of start-up, suitable measures must be taken, in order to deactivate this safety function, especially at the beginning of start-up.

It has now been shown that with the conventional safety cut-out of the electrical fuel pump in internal combustion engines, possibilities of errors can arise which lead to unwarranted triggering of this safety cut-out.

SUMMARY OF THE INVENTION

It is therefore the object of this invention to develop and provide a safe and reliable control system for an electrical fuel pump of an internal engine having an improved safety shut off.

According to the invention, the control system for an electrically driven fuel pump of an internal combustion engine comprises means for sensing a speed of a shaft of the engine, means for sensing another speed, and logic means for generating a shut off signal for the fuel pump. The logic means is connected to both sensing means and has comparison means receiving speed signals from said sensing means for shutting off the fuel pump only if both speeds deviate from a specified speed range.

With the control system for the electric fuel pump of an internal combustion engine in accordance with the invention, a high degree of safety and reliability of a fuel pump shut off system is achieved, which can, moreover, be realised in a simple manner.

BRIEF DESCRIPTION OF THE DRAWING

The objects, features and advantages of the present invention will now be illustrated in more detail by the following detailed description, reference being made to the accompanying drawing in which:

The sole FIGURE is a block diagram of a device for controlling an electric fuel pump of an internal combustion engine according to the invention.

DESCRIPTION OF THE PREFERRED EMBODIMENT

The embodiment shown in the drawing is a control system for the electric fuel pump of an internal combustion engine, in which the electric motor of the fuel pump, not shown in further detail, is designated 10. It receives its supply voltage $E_{Batt}$ via a switch 11 from a supply line 12.

13 represents a first sensor for a first engine speed; 14 is a second sensor for a second engine speed. In the concrete case, the sensor 13 is assigned to the engine crankshaft, and the sensor 14 to the camshaft. On the output side, the two sensors 13 and 14 are connected to a block 15, in which one threshold value interrogation each, 16a and 16b, is symbolically shown for the signals of the two sensors 13 and 14, as is an AND-gate 17 for the output signals of the threshold value interrogations. For its part, this AND-gate 17 in turn controls the switch 11 between the electricity supply line 12 and the electric motor 10 of the fuel pump. To complete it, block 15 is connected with the electricity supply line 12 via a supply voltage connection 19.

The fundamental idea of the present invention is that the switch 11, connected in series with the electric motor 10 of the fuel pump, opens, depending on the engine speed, only when both the signal from sensor 13 and the signal from sensor 14 show a minimum value. In this way it is ensured that the vehicle can still be driven if one of the two sensors 13 or 14 should fail.

The AND-gate 17, shown in block 15, in conjunction with the pre-received threshold value interrogations, carry out a generally known plausibility interrogation of the two signals from the sensors 13 and 14, and only when these two signals are plausible relative to each other, and both speed values fall below a selectable lower value, is the switch 11 opened.

It has proved to be particularly expedient if the two sensors 13 and 14 are assigned to different shafts of the internal combustion engine, i.e. sensor 13, for example, to the crankshaft, and sensor 14 to the camshaft. Naturally the plausibility interrogation of the output signals of the sensors 13 and 14 must take into account the differing absolute values, or the relationship, between crankshaft speed and camshaft speed.

It is of course necessary to ensure that at the beginning of a start-up process, the fuel pump can actually supply fuel. To this end, means are envisaged which render the plausibility interrogation ineffective during the phases of the start-up process.

In addition to switching off the fuel pump at low engine speed, the control system in accordance with this invention can also be employed as an overspeed protection for the engine, in that the electricity supply to the fuel pump is then interrupted if critical safety speeds are exceeded. In this case too, the system can activate if the plausibility interrogation of both values of the sensors 13 and 14 show that a critical safety speed is exceeded.

It will be understood that each of the elements described above, or two or more together, may also find a useful application in other types of constructions differing from the types described above.

While the invention has been illustrated and described as embodied in a control system for the electric fuel pump of an internal combustion engine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. Control system for an electrically driven fuel pump of an internal combustion engine, said control system comprising first means for sensing a speed of a shaft of said engine, second means for sensing another speed, and logic means for generating a shut off signal for said fuel pump, said logic means being connected to both of said sensing means and having comparison means for generating said shut off signal so as to shut off said fuel pump only if both of said speeds sensed by both said first and second means deviate from a predetermined speed range but not to shut off said fuel pump if only one of said speeds sensed by only one of said means deviates from a predetermined speed range.

2. Control system as defined in claim 1, wherein said internal combustion engine has a crankshaft and a camshaft, and said first means for sensing a speed of a shaft of said engine detects a crankshaft speed of said engine and said second means for sensing another speed detects a camshaft speed of said engine.

3. Control system as defined in claim 1, wherein said logic means includes switching means for interrupting a flow of electricity to said electrically driven fuel pump if both of said speeds sensed by both said first and second means deviate from said predetermined speed range, and wherein said predetermined speed range is defined by a minimum and maximum speed value.

4. Control system as defined in claim 1, further comprising means for preventing said logic means from shutting off said fuel pump when said internal combustion engine is being started.

* * * * *